United States Patent [19]

Komine

[11] Patent Number: 4,470,077
[45] Date of Patent: Sep. 4, 1984

[54] VIDEO SYSTEM

[75] Inventor: Yoshio Komine, Kanagawa, Japan

[73] Assignee: Canon Kabushiki Kaisha, Tokyo, Japan

[21] Appl. No.: 364,890

[22] Filed: Apr. 2, 1982

[30] Foreign Application Priority Data

Apr. 17, 1981 [JP] Japan .................................. 56-58168

[51] Int. Cl.³ .......................... H04N 5/76; H04N 5/26
[52] U.S. Cl. .................................... 358/335; 358/225; 358/229; 358/906
[58] Field of Search ............... 358/335, 906, 209, 229, 358/225

[56] References Cited

U.S. PATENT DOCUMENTS 4,161,754  7/1979  Leeson et al. ................... 358/229 X
4,232,329 11/1980  Horak et al. ..................... 358/906 X Primary Examiner—Robert L. Richardson
Attorney, Agent, or Firm—Toren, McGeady and Stanger

[57] ABSTRACT

A video system comprising a unitary body type camera, constituted of a video camera for image pick up and a recorder for recording the image signal obtained from the camera, and a reproducing adapter used in combination with the unitary body type camera. The lens of the camera is covered with the reproducing adapter when the adapter is mounted on the unitary body type camera. The reproducing adapter is connected to the camera for converting the recorded image signal into a signal reproducible on a TV receiver.

9 Claims, 3 Drawing Figures

VIDEO SYSTEM

BACKGROUND OF THE INVENTION

1. Field of the Invention

The present invention relates to a video system consisting of a unitary body type camera, constituted of a video camera for image pick up and a recorder for recording the image signal obtained from the camera, and a reproducing adapter used in combination with the unitary body type camera. The reproducing adapter is the device for connection to the camera for converting the recorded image signal into a signal reproducible on a TV receiver.

2. Description of the Prior Art

In the conventional video system consisting of a video camera and a recorder, the camera is separate from the recorder because of size and weight considerations. They are connected to each other with a cable and carried together. However, quite recently thanks to the solid image pick up element such as CCD, there is a substantial possibility that the video camera can be made smaller and lighter and a video camera system with a built in recorder has been proposed. Such a single body type camera, in which has a built in video tape recorder (hereinafter called VTR), should be as small and light as possible to thereby increase operability at the time of photographing. Thus, the built-in VTR requires only a recording capability and the apparatus for reproduction will be constructed separately. The image recorded on the tape is displayed with a TV receiver by means of the VTR built in the camera and the separate reproducing adapter. In such a system the lens of the camera, etc. are not used at the time of reproduction, and only the VTR in the camera is used so that it is necessary to protect the lens and, etc. from dust. Furthermore, the lens or the microphone generally projects from the camera body, which makes it essential to protect the lens, etc. from damage.

SUMMARY OF THE INVENTION

In view of the above shortcomings an object of the present invention is to provide a video system in which, at the time of reproduction when a photographing capability is not necessary, the photographing lens and the sound recording microphone do not project from the camera body so as to be exposed to dust or subjected to improper operation. More specifically the present invention provides a video system in which the reproducing adapter is provided with a cover member for the photographing lens.

Other objects of the present invention will be understood from the descriptions made with reference to the accompanying drawings.

DESCRIPTION OF THE PREFERRED EMBODIMENTS

Figure 1:
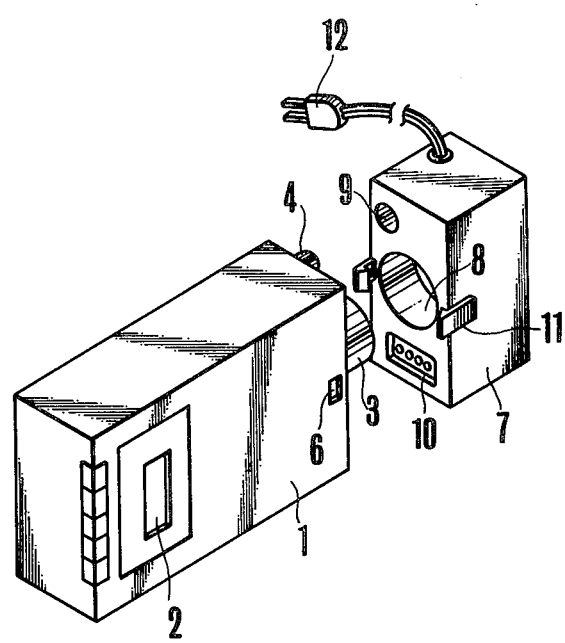
FIG. 1 is a perspective view of an embodiment of the video camera system in accordance with the present invention.

An embodiment of the present invention is explained below in accordance with FIGS. 1 to 3. In the drawings the apparatus includes a camera body 1 in which a VTR is built in, a loading part 2 of the cassette in which the video tape is loaded, a photographing lens 3, a sound recording microphone 4, an electrical circuit connector 5 arranged on the front plate of the camera body 1 and the lock part 6 at the side of the camera body for mounting the reproducing adapter device 7. The tape reproducing circuit and the AC power source are built into the reproducing adapter 7. Furthermore, the output signal of the adapter 7 is the standard television signal or the standard television signal modulated in VHF with a built-in RF converter. The photographing lens 3 of the camera body 1 is disposed in the concave part 8 and the concave part 9 has the sound recording microphone 4 disposed therein. On the surface of the adapter by which the adapter is mounted on the camera body 1, the connector 10 at the side of the reproducing adapter registers with the electrical circuit connector 5 at the side of the camera body 1 in such a manner that the electrical circuit between the adapter 7 and the camera body 1 is automatically connected by means of the connectors 5 and 10 when the adapter 7 is mounted on the front plate of the camera body by means of a locking claw 11. The plug 12 is connected to a commercial AC power receptacle (not shown) and the key switch 13 for controlling picture recording, reproduction, quick feeding, etc.

Figure 2:
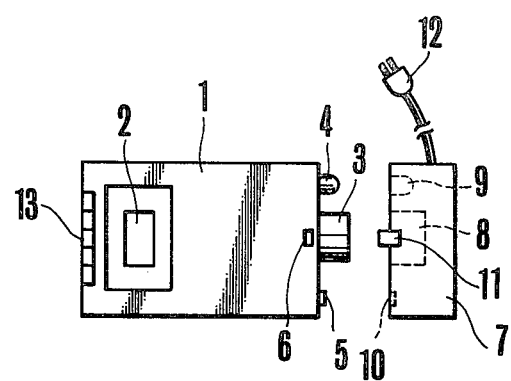
FIG. 2 is a side view of the system in FIG. 1, whereby the single body type camera is separated from the reproducing adapter.

In the video camera in accordance with the present invention, as is shown in FIGS. 1 and 2, the adapter 7 is separated from the camera body 1 and the picture and the sound are recorded in the built-in video tape, whereby only the camera body 1 is used. Thus, the camera body includes the image pick up means for converting the image formed with the lens 3 into the image signal, the sound circuit for converting the sound obtained with the microphone 4 into the sound signal to be recorded, the recording device for recording the image signal and the sound signal on a tape and the built-in power source for driving the above means.

Figure 3:
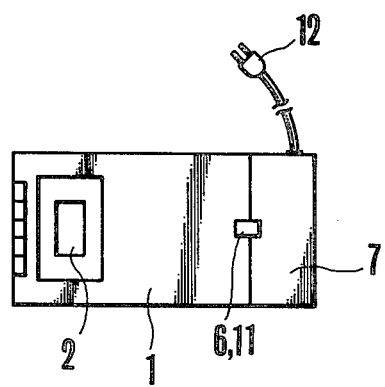
FIG. 3 is a side view of the system in FIG. 1, in which the unitary body type camera is connected to the reproducing adapter.

In order to reproduce the recorded signal and display the image with the television receiver, the reproducing adapter 7 is mounted on the front plate of the camera body 1, as shown in FIG. 3. In this way the lens 3 and the sound recording microphone 4 projecting from the front plate of the camera body are positioned in the concave parts 8 and 9 of the adapter 7. At the same time the camera body 1 is connected via the connector 5 to the connector 10 of the adapter 7. At this time the locking claw 11 of the adapter 7 is engaged with the lock part 6 of the camera body in such a manner that the camera and the adapter make one body, whereby the lens and the microphone of the camera body (which are not necessary during reproduction) are covered and protected with the adapter 7. The video camera system can now carry out reproduction in the same way as in the stationary VTR so that the image and the contents of another video tape can be displayed with the system.

By providing the camera body with the video signal input terminal the programs of the TV broadcasting bureau can be recorded in the same way as with the more conventional VTR.

Although the present embodiment relates to a magnetic tape recorded with the VTR, it goes without saying that a magnetic disc can also be recorded.

In the video system in accordance with the present invention, the camera body may be separated from the reproducing adapter. Consequently during photographing operations the system can be used as a compact camera with a built in recorder. Furthermore, at the time of reproduction operations, the user may mount the reproducing adapter so the lens and the microphone of the camera are covered with the reproducing adapter. Consequently neither the lens nor the microphone is an obstacle at the time of reproduction, and the lens and the microphone are protected from damage and dust. The present invention is not limited to the above embodiment but can be applied and modified in many ways within the gist of the claims.

What is claimed is:

1. A video system comprising:
    (a) a video camera including:
       image pick up means for picking up an object image and producing image signals;
       an optical lens system for focusing said object image onto said image pick up means;
       recording means for recording said image signals on a recording medium; and
       camera casing means for enclosing said image pick up means and said recording means;
    (b) a reproducing apparatus including:
       converting means for converting the signals recorded on said medium to video signals which can be displayed by the television set; and
       second casing means for accommodating said converting means;
    (c) coupling means for mechanically coupling said camera casing means and said second casing means;
    (d) transmitting means for transmitting said image signals to said converting means; and
    (e) covering means arranged to cover said optical lens in response to a coupling operation of said camera casing means with said second casing means by said coupling means.

2. A video system in accordance with claim 1, further including a microphone provided in said camera for converting voices to electrical signals, and second covering means arranged to cover said microphone in response to said coupling operation.

3. A video system in accordance with claim 2, wherein said second covering means is provided in said reproducing apparatus.

4. A video system in accordance with claim 2, wherein said second covering means has a second recessed portion which accommodates said microphone.

5. A video system in accordance with claim 1, wherein said transmitting means has an output terminal provided on said video camera to produce said image signals, and an input terminal provided on said reproducing apparatus to receive said image signals, whereby said output terminal is brought into connection with said input terminal in response to a coupling operation of said camera casing means with said second casing means by said coupling means.

6. A video system in accordance with claim 1, wherein said covering means is provided in said reproducing apparatus.

7. A video system in accordance with claim 6, wherein said covering means consists of a recessed portion which accommodates said lens system.

8. A video system in accordance with claim 1, wherein said reproducing apparatus has a plug to be connected to the commercial convenience outlet.

9. A video system in accordance with claim 1, wherein said video camera further has a built-in power source.

* * * * *